US008354368B2

(12) United States Patent
Schunicht et al.

(10) Patent No.: US 8,354,368 B2
(45) Date of Patent: Jan. 15, 2013

(54) CLEANING COMPOSITION COMPRISING GRAFT COPOLYMERS

(75) Inventors: Christoph Schunicht, Duesseldorf (DE); Thomas Albers, Duesseldorf (DE); Ute Lemke, Neuss (DE); Michael Langen, Hilden (DE); Rainer Eskuchen, Langenfeld (DE)

(73) Assignee: Cognis IP Management GmbH, Duesseldorf (DE)

( * ) Notice: Subject to any disclaimer, the term of this patent is extended or adjusted under 35 U.S.C. 154(b) by 55 days.

(21) Appl. No.: 13/000,402

(22) PCT Filed: Jun. 12, 2009

(86) PCT No.: PCT/EP2009/004262
§ 371 (c)(1),
(2), (4) Date: Dec. 21, 2010

(87) PCT Pub. No.: WO2009/156067
PCT Pub. Date: Dec. 30, 2009

(65) Prior Publication Data
US 2011/0118168 A1 May 19, 2011

(30) Foreign Application Priority Data
Jun. 24, 2008 (EP) .................................... 08011487

(51) Int. Cl.
*C11D 3/37* (2006.01)
*B08B 3/04* (2006.01)
(52) U.S. Cl. ........ 510/475; 510/400; 510/470; 527/312; 527/314; 134/25.2; 134/25.3; 134/39; 134/42
(58) Field of Classification Search .................. 510/400, 510/470, 475; 527/312, 314; 134/25.2, 25.3, 134/39, 42
See application file for complete search history.

(56) References Cited

U.S. PATENT DOCUMENTS

| 5,277,446 A | 1/1994 | Hamel |
| 5,760,154 A | 6/1998 | Krause et al. |
| 5,783,616 A | 7/1998 | Krause et al. |
| 2008/0020948 A1* | 1/2008 | Rodrigues et al. ............ 507/111 |

FOREIGN PATENT DOCUMENTS

| CA | 2047747 | 2/1998 |
| DE | 4239076 A1 | 5/1994 |
| DE | 4314661 | 11/1994 |
| DE | 4316740 | 11/1994 |
| DE | 4321429 A1 | 5/1995 |
| DE | 19503116 A1 | 8/1996 |
| EP | 0441197 A2 | 8/1991 |
| EP | 0526800 A1 | 2/1993 |
| EP | 0725131 A1 | 8/1996 |
| EP | 1881017 A2 | 1/2008 |
| WO | WO-92/10433 | 6/1992 |
| WO | 94/01476 A1 | 1/1994 |
| WO | 94/26858 A1 | 11/1994 |
| WO | WO-95/00624 | 1/1995 |

OTHER PUBLICATIONS

Notice of Opposition to EP 2138560 to European Patent Office, Nov. 15, 2011, 9 pp.

* cited by examiner

*Primary Examiner* — Brian P Mruk
(74) *Attorney, Agent, or Firm* — Diehl Servilla LLC

(57) ABSTRACT

Disclosed is the use of water-soluble graft copolymers prepared by free-radically initiated graft polymerization of 40 to 90% by weight of component (A), selected from the group consisting of monosaccharides, oligosaccharides, polysaccharides and derivatives thereof, with 5 to 40% by weight of monomers (B), selected from the group consisting of ethylenically unsaturated C3-C10 monocarboxylic acids or the alkali or ammonium salts thereof, and 10 to 50% by weight of monomers (C), selected from the group consisting of ethylenically unsaturated N-containing monomers and/or ethylenically unsaturated monomers containing sulfo-groups, in cleaning compositions which, as well as the graft polymer, comprise at least one surfactant component, for hydrophilization and/or improvement of shine retention of hard surfaces which have been brought into contact with these cleaning compositions.

15 Claims, No Drawings

CLEANING COMPOSITION COMPRISING GRAFT COPOLYMERS

CROSS REFERENCE TO RELATED APPLICATIONS

This application is the National Phase entry of PCT/EP2009/004262, filed Jun. 12, 2009, which claims priority to European Application No. 08011487, filed Jun. 24, 2008, both of which are incorporated herein by reference in their entireties.

FIELD OF THE INVENTION

The present invention relates to specific graft copolymers and cleaning compositions for hard surfaces which comprise these polymers.

BACKGROUND OF THE INVENTION

Cleaning compositions for hard surfaces, for example all-purpose cleaners, kitchen cleaners or bath cleaners, but also dishwashing compositions, often comprise ingredients which lead to hydrophilization of surfaces, which leads to water spreading better on these surfaces and water drops thus forming a film more quickly which can more easily run off the surface. WO 94/26858 discloses e.g. liquid cleaning compositions which, besides a surfactant, also have anionic polymers comprising acrylic acid, methacrylic acid or maleic anhydride as monomers. DE 195 03 116 A1 discloses graft copolymers based on saccharides which comprise acrylic acid or acrylamides as grafted side chains. However, it only specifically discloses graft copolymers based on maltodextrin and maleic anhydride and their use as additives in dishwashing compositions.

However, there is a need for further improved additives for cleaning compositions both in terms of their performance and also as regards biodegradability.

It has been found that graft copolymers based on saccharides which are grafted with at least two different monomers have advantages in terms of their application properties and also biodegradability.

DETAILED DESCRIPTION OF PREFERRED EMBODIMENTS

A first embodiment of the invention relates to the use of water-soluble graft copolymers prepared by free-radically initiated graft polymerization of from 40 to 90% by weight of (A) monosaccharides, oligosaccharides, polysaccharides and derivatives thereof, with 5 to 40% by weight of monomers (B), selected from the group of ethylenically unsaturated C3-C10 monocarboxylic acids or alkali metal or ammonium salts thereof and 10 to 50% by weight of monomers (C), selected from the group of ethylenically unsaturated N-containing monomers, and/or ethylenically unsaturated monomers containing sulfo groups, in cleaning compositions which, as well as the graft polymer, also comprise at least a surface-active component, for improving the shine retention of hard surfaces which have been brought into contact with these cleaning compositions.

"Graft copolymers" is the term used to refer to the polymers prepared by the process of graft copolymerization known to the person skilled in the art. Graft copolymers are compounds known per se. DE 195 03 116 and EP 441 197 A2 describe in each case graft copolymers based on sugars, acrylates and N-containing or sulfo-group-containing monomers, where a use of these polymers as additive in washing or cleaning compositions is also disclosed. However, the specification only specifically discloses polymers which have maleic acid and acrylic acid as monomer constituents. Moreover, the specification lacks the disclosure that the copolymers are suitable for effectively making hard surfaces hydrophilic, and/or imparting longer-lasting shine to the surfaces, versus the treatment without the polymers.

In the present case, the graft base of the graft copolymers according to the invention is formed by saccharides (A), specifically mono-, oligo- and/or polysaccharides. Monosaccharides are linear polyhydroxyaldehydes (aldoses) or polyhydroxyketones (ketoses). In the case of the monosaccharides, primarily the pentoses and pentuloses ($C_5H_{10}O_5$) and also the hexoses and hexyloses ($C_6H_{12}O_6$) play a role. Suitable (aldo)pentoses are e.g. d-ribose, d-xylose and l-arabinose. (Aldo)hexoses which may be mentioned are d-glucose, d-mannose and d-galactose; in the case of the hexyloses (formerly ketohexoses), primarily d-fructose and sorbose are to be mentioned. The 6-deoxy sugars l-fucose and l-rhamnose are likewise suitable hexoses.

Oligosaccharides are generally molecules which are formed by condensation of from two to ca. ten monosaccharides and belong to the group of glycans. With these, linear, branched and cyclic oligosaccharides can be formed.

The polysaccharides include biopolymers such as starch and glycogen, and also the structural polysaccharide cellulose which, like dextran and tunicin, can be regarded as polycondensation product of d-glucose (glucans), inulin as polycondensate of d-fructose (fructans), chitin, alginic acid and others.

Polysaccharides are preferred components of type (A). Of suitability here are both starch itself, but in particular its degradation products. Like glycogen or cellulose, starch belongs to the homoglycans and is a polycondensation product of d-glucose. Starch consists of 3 different d-glucopyranose polymers, amylose, amylopectin and a so-called intermediate fraction, which is also referred to as abnormal amylopectin. Maltodextrins are formed from starch by enzymatic or chemical degradation. Maltodextrin covers mixtures of monomers, dimers, oligomers and polymers of glucose. The percentage composition differs depending on the degree of hydrolysis. This is described by the dextrose equivalent, which is between 3 and 40 in the case of maltodextrin. Maltodextrins are a particularly preferred component (A) within the context of the present technical teaching. However, starch which has been degraded by a chemical route, e.g. by acid-catalyzed hydrolysis or by an oxidative route, is suitable as main chain or graft base of the graft copolymers used according to the invention.

Suitable monomers of type (B) are generally ethylenically unsaturated C3-C10 monocarboxylic acids (branched or linear) or alkali metal or ammonium salts thereof. Preferred monomers are acrylic acid or methacrylic acid. Any desired mixtures of the monocarboxylic acids and in particular mixtures of acrylic acid and methacrylic acid are also preferred components (B).

The monomers of type (C) likewise include ethylenically unsaturated compounds, although these can be differentiated from the compounds of type (B) in that they are N-containing molecules, or in that the monomers contain sulfo groups. Naturally, N-containing monomers which contain sulfo groups are also included. The compounds of type (C) preferably have a cationic character, i.e. they form salts with anions such as chlorides. Any desired mixtures of the monomers of type (C) are also suitable. N-Containing monomers are e.g. amides and N-substituted amides, such as acrylamide, methacrylamide, N-alkylacrylamides, mono-, di- or trimethylaminopropylmethacrylamide or N-vinylimidazoles. It is of course also possible to use any desired mixtures of the different monomers of type (C). Sulfo-group-containing monomers include without limitation, vinylsulfonic acid, allylsulfonic acid, methallylsulfonic acid and acrylamidomethylpropanesulfonic acid. Particularly preferred monomers of type (C) are methacrylamidopropyltrimethylammonium chloride (MAPTAC) or acrylamidopropyltrimethylammonium chloride (APTAC) or diallyldimethylammonium chloride (DADMAC).

The graft copolymers used according to the invention can optionally also comprise further monomers, e.g. hydroxyalkyl esters or esters of alkoxylated fatty alcohols, although such comonomers are not preferred. In all cases, it is possible to use mixtures of different monomers (B) or (C) and in this connection, where appropriate, to also use mixtures of the sugar component (A). The graft copolymers of the present teaching are water-soluble, i.e. they preferably have a solubility in water (measured at 21° C.) of at least 1 g of the graft copolymer in 100 g of water, but preferably larger amounts, e.g. 10 g per 100 g of water, are soluble under the stated conditions.

Not covered by the teaching of the present application are in particular those graft copolymers which comprise di- or polycarboxylic acids and here in particular maleic acid or maleic anhydride as monomer constituents. In one preferred embodiment, the graft copolymers of the invention are free from such dicarboxylic acids and in particular free of maleic acid or its anhydride.

By contrast, preferred graft copolymers within the context of the present technical teaching are those in which the weight fraction of the monomers (C) is larger than the fraction of the monomers (B).

The constituents of type (A) are present in the polymers of the present invention in amounts of from 40 to 90% by weight, preferably from 40 to 85% by weight, in each case based on the total weight of all of the constituents (A), (B) and (C) of the graft copolymer. It is the case that an increased fraction of saccharides of type (A) leads to improved biodegradability of the graft copolymers. A particularly preferred weight range for component (A) is 70 to 80% by weight. The monomers of type (B) are present in amounts of from 5 to 40% by weight, preferably from 5 to 35% by weight and in particular from 10 to 30% by weight, in each case based on the total weight of all of the constituents in the polymer. The monomers of type (C) are present in amounts of from 10 to 50% by weight, preferably from 10 to 40% by weight and particularly preferably from 15 to 30% by weight, in each case based on the total weight of all of the constituents in the polymer.

A preferred graft copolymer is e.g. formed from 50 to 80% by weight of component (A) and the monomers (B) are present therein in amounts of from 10 to 35% by weight and the monomers (C) are present in amounts of from 10 to 30% by weight, based on the total amount of (A), (B) and (C), where the sum of (A), (B) and (C) must be 100% by weight.

It is advantageous if the weight fraction of monomers of type (C) is larger than the fraction of the monomer (B). Graft copolymers in which the monomers (B) and (C) have a weight ratio of from 1:1 to 1:2, but preferably from 1:1.2 to 1:1.5 and particularly preferably from 1:1.2 to 1:1.4 are therefore particularly preferred. The monomers (B) and (C) have among one another preferably a molar ratio of from 4:1 to 1:1 and in particular from 3:1 to 2:1.

Besides the constituents (A) to (C), the graft copolymers can also have further copolymerizable components, although the amounts of the constituents must then always add up to 100%, but preference is given to those graft copolymers which consist only of the constituents (A) to (C), although initiators may be present here in the graft copolymers as a result of the preparation, albeit only in minor amounts (<1% by weight).

Preferred graft copolymers comprise maltodextrin as component (A), acrylic acid as monomer (B) and MAPTAC and/or DADMAC as monomer (C), these preferred polymers advantageously comprising between 50 and 85% by weight of maltodextrin, 10 to 35% by weight of MAPTAC and 5 to 30% by weight of acrylic acid, with the proviso that the weight data of (A) to (C) add up in each case to 100% by weight.

The molecular weight of the graft copolymers according to the invention is in the range from 5000 to 150 000, preferably from 8000 to 80 000 and in particular in the range from 10 000 to 50 000. The graft copolymers within the context of the present invention can be referred to as amphoteric with regard to their charge.

Within the context of the present technical teaching, the graft copolymers can hydrophilize hard surfaces such as porcelain, ceramic, metal, glass, plastic or stone, and in particular ceramic and glass, i.e. the water drops which are applied to the surfaces treated with the graft copolymers have a smaller contact angle compared with an untreated surface. This leads to better spreading of the water drops, which can thus better form a water film on the surface, which leads macroscopically to improved run-off of water on the particular surface. This property leads to deposit formation (so-called "filming" or "spotting") occurring only to a slight extent, if at all, on the treated surfaces, which, from the point of view of the user, can bring about an improved effect of the cleaning composition.

The graft copolymers used according to the invention lead, in combination with further surfactants, to an improved shine retention and in particular to an improvement in shine perception of hard surfaces. Shine is the physical name for the photometrically determinable proportion of the directed fraction and the diffusely reflected fraction of the light beam incident on a surface. Colloquially, shine is referred to as the property, resulting from this ratio, of a light-reflecting surface to bring about different lightness impressions depending on the direction of illumination and direction of observation. The graft copolymers, applied to a hard surface, lead to an extension in shine perception compared with untreated surfaces.

The present invention further provides water-soluble graft copolymers prepared by free-radically initiated graft polymerization from 40 to 90% by weight of maltodextrin, 10 to 40% by weight of 3-trimethylammonium propylmethacrylamide chloride and/or dimethyldiallylammonium chloride and 5 to 30% by weight of acrylic acid.

The graft copolymers within the context according to the invention are readily biodegradable, i.e. they have at least 35%, preferably at least 40% and in particular between 35 and 75% degradation after 28 days in the OECD-$CO_2$ evolution test according to 301 B (July 1992).

The present application likewise provides cleaning compositions, preferably those for hard surfaces, which contain water-soluble graft copolymers prepared by free-radically initiated graft copolymerization of from 40 to 90% by weight of a component (A), selected from the group of monosaccharides, oligosaccharides, polysaccharides and derivatives thereof, with 5 to 40% by weight of monomers (B), selected from the group of ethylenically unsaturated C3-C10 monocarboxylic acids or alkali metal or ammonium salts thereof, and 10 to 50% by weight of monomers (C), selected from the group of ethylenically unsaturated N-containing monomers, and/or ethylenically unsaturated monomers containing sulfo groups. Particular preference is given here to those polymers which comprise are prepared by polymerization of from 40 to 90% by weight of maltodextrin, 10 to 40% by weight of 3-trimethylammonium propylmethacrylamide chloride and/or dimethyldiallylammonium chloride and 5 to 40% by weight of acrylic acid, where the amounts of the three specified constituents must add up to 100% by weight.

The graft copolymers are present in the cleaning compositions preferably in amounts of from 0.01 to 15% by weight, preferably in amounts of from 0.05 to 1.0% by weight and in particular in amounts of from 0.1 to 0.5% by weight.

Particularly preferred cleaning compositions within the context of the present invention are all-purpose cleaners, glass cleaners, kitchen cleaners, bath or toilet cleaners, but also dishwashing compositions and here particularly compositions for automatic dishwashing, it being possible for the cleaning composition to be solid or liquid or gel-like as required. Compressed or otherwise compacted solid compositions, e.g. in the form of granules, extrudates, tablets, are also suitable. The graft copolymers are suitable in particular for incorporation into multifunctional compositions which e.g. besides the cleaning function, also have a salt function and/or further areas of application (rinse aid, metal protection etc. in the case of dishwashing compositions).

Moreover, the cleaning compositions within the context of the present invention also comprise at least one surface-active constituent, selected from the group of anionic, nonionic, cationic and/or amphoteric surfactants.

Typical examples of anionic surfactants are soaps, alkylbenzenesulfonates, alkanesulfonates, olefinsulfonates, alkyl ether sulfonates, glycerol ether sulfonates, alpha-methyl ester sulfonates, sulfo fatty acids, alkyl sulfates, fatty alcohol ether sulfates, glycerol ether sulfates, fatty acid ether sulfates, hydroxy mixed ether sulfates, monoglyceride (ether) sulfates, fatty acid amide (ether)sulfates, mono- and dialkyl sulfosuccinates, mono- and dialkyl sulfosuccinamates, sulfotriglycerides, amide soaps, ether carboxylic acids and salts thereof, fatty acid isethionates, fatty acid sarcosinates, fatty acid taurides, N-acylamino acids, such as, for example, acyl lactylates, acyl tartrates, acyl glutamates and acyl aspartates, alkyl oligoglucoside sulfates, protein fatty acid condensates (in particular wheat-based vegetable products) and alkyl (ether) phosphates. If the anionic surfactants contain polyglycol ether chains, these can have a conventional homologue distribution, but preferably have a narrowed homologue distribution. Typical examples of nonionic surfactants are fatty alcohol polyglycol ethers, alkylphenol polyglycol ethers, fatty acid polyglycol esters, fatty acid amide polyglycol ethers, fatty amine polyglycol ethers, alkoxylated triglycerides, mixed ethers and mixed formals, optionally partially oxidized alk(en)yl-oligoglycosides or glucoronic acid derivatives, fatty acid N-alkylglucamides, protein hydrolysates (in particular wheat-based vegetable products), polyol fatty acid esters, sugar esters, sorbitan esters, polysorbates and amine oxides. If the nonionic surfactants contain polyglycol ether chains, these can have a conventional homologue distribution, but preferably have a narrowed homologue distribution.

Typical examples of cationic surfactants are quaternary ammonium compounds and ester quats, in particular quaternized fatty acid trialkanolamine ester salts. Typical examples of amphoteric or zwitterionic surfactants are alkylbetaines, alkylamidobetaines, aminopropionates, aminoglycinates, imidazoliniumbetaines and sulfobetaines. The specified surfactants are exclusively known compounds.

Of suitability are e.g. nonionic surfactants and in this connection also the alkoxylated fatty alcohols or alkoxylated fatty acids having 6 to 22 carbon atoms or derivatives thereof, the alkyl(oligo)glycosides or hydroxylated ether compounds.

Preferred nonionic surface-active substances are selected from a) compounds of the general formula (I)

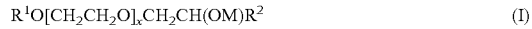

in which $R^1$ is a linear or branched alkyl and/or alkenyl radical having 4 to 22 carbon atoms, or is a radical $R^2$—CH(OH)CH$_2$, where $R^2$ is a linear or branched alkyl and/or alkenyl radical having 8 to 16 carbon atoms, x is a number from 40 to 80, and M is a hydrogen atom or a saturated alkyl radical having 1 to 18 carbon atoms, b) compounds of the formula (II)

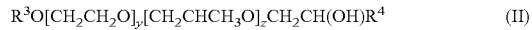

in which $R^3$ is a linear or branched alkyl and/or alkenyl radical having 8 to 22 carbon atoms, $R^4$ is a linear or branched alkyl and/or alkenyl radical having 8 to 16 carbon atoms, y is a number from 10 to 35, and z is zero or a number from 1 to 5, with the proviso that when $R^3$=$R^1$ and at the same time $R^4$=$R^2$, then z must be at least 1, and/or c) ethoxylated fatty alcohols of the general formula (III) $R^5$—(OC$_2$H$_4$)$_z$—OH, in which $R^5$ is linear or branched alkyl and/or alkenyl radicals having 8 to 22 carbon atoms and z is a number from 1 to 10, and/or d) $R^6$CO—(OC$_2$H$_4$)$_m$—OR$^7$, where $R^6$ is an alkyl and/or alkenyl radicals having 7 to 21 carbon atoms and m is numbers from 11 to 100, and $R^7$ is a hydrogen atom or a radical CO—$R^6$, and/or e) alkyl(oligo)glycosides of the general formula $R^8$O—[G]$_p$, in which $R^8$ is an alkyl and/or alkenyl radical having 4 to 22 carbon atoms, G is a sugar radical having 5 or 6 carbon atoms and p is numbers from 1 to 10, and/or f) betaines and/or g) compounds of the general formula (III)

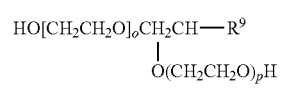

in which $R^9$ is a linear or branched alkyl and/or alkenyl radical having 4 to 22 carbon atoms and o is a number from 1 to 20 and the index p is zero or numbers from 1 to 20, and/or h) compounds of the general formula (IV)

in which $R^{10}$ is a saturated or unsaturated, branched or unbranched alkyl or alkenyl radical having 8 to 16 carbon atoms, and $R^{11}$, in each case independently of one another, symbolize a radical (CH$_2$CH$_2$O)$_r$CH$_2$CH(OH)R$^{12}$, where r in each radical $R^{11}$ is independently zero or a number from 1 to 50, and $R^{12}$ is a saturated or unsaturated, branched or unbranched alkyl or alkenyl radical having 8 to 16 carbon atoms, and/or j) compounds of the general formula (V)

where $R^{13}$, independently of one another, is a radical (CH$_2$CH$_2$O)$_s$(CH$_2$CH(OH)R$^{14}$ or an alkyl radical having 8 to 16 carbon atoms and s for each individual radical $R^{13}$ is independently zero or a number from 1 to 50.

Particularly suitable surface-active compounds are generally nonionic surfactants, and here in particular the alkyl alkoxylates, i.e. e.g. compounds of type a) to d) according to the above list.

Besides the surfactants, the cleaning compositions within the context of the present invention can also comprise further ingredients customary per se, such as e.g. water, solvents such as lower alcohols, here in particular ethanol, propanol or butanol; glycols; polymers other than those described above; agents for adjusting the pH, e.g. organic acids such as citric acid; fillers; silicates; complexing agents, hydrotopes; perfumes; dyes; enzymes, antioxidants; preservatives; etc. The cleaning compositions within the context of the above description, if they are aqueous, have pH values preferably between 3.5 and 11.

A last subject-matter relates to a process for preparing graft copolymers according to the above description, where firstly an aqueous solution of the sugar constituent (A), e.g. a maltodextrin, is introduced as initial charge and then heated to temperatures of from 60 to 95° C., and then a mixture of the monomers (B) and (C) together with a free-radical initiator is added, and the mixture is reacted.

The process can be designed advantageously such that the monomers (B) and (C) together with a free-radical initiator as mixture can be reacted not entirely, but e.g. in portions or continuously, with the sugar constituent (A) over a prolonged period.

A second variant provides that firstly only some of the monomers (B) or (C) are added to the sugar component (A), then the remainder in a mixture as (B) and (C) in succession, in which case a free-radical initiator is also always added upon each addition of the monomers.

A particularly preferred variant provides that firstly the sugar component (A) is introduced as initial charge in water and is heated, and then, preferably in two or more addition steps, a part amount of the monomer (C) is added together with a free-radical initiator, and the reaction with the sugar component (A) is awaited. Afterwards, preferably in two or more addition steps, a mixture of (B) and the remainder of (C) is added together with a further free-radical initiator.

If a non-water-soluble form is to be used as sugar constituent, this must firstly be converted to a water-soluble form by means of enzymes or acids. Details can be found in DE 195 03 116 A1, which is incorporated herein by reference, on page 8, lines 31 to 59.

Of suitability for initializing the free-radical polymerization are the free-radical initiators known to the person skilled in the art for this purpose, such as e.g. azodiisobutyronitrile (AIBN), peroxides such as e.g. benzoyl peroxide, also hydroperoxides and peresters. Particular preference is given to using sodium peroxodisulfate and tert-butyl hydroperoxide or hydrogen peroxide, which can be used in the standard commercial concentrations and preparations (e.g. as aqueous or alcoholic solution). Mixtures of $H_2O_2$ with iron(II) salts can also be used. The hydrogen peroxide is preferably used here in the form of aqueous solutions. The free-radical initiators are preferably used in amounts of from 0.001 to 15 mol %, preferably from 0.1 to 10 mol % and in particular from 1 to 8 mol %, in each case based on the molar amounts of monomers (B) and/or (C).

The polymerization reaction itself preferably takes place at temperatures between 60 and 95° C., in particular from 70 to 85° C. Depending on the size of the reaction batch, the reaction lasts between a few minutes and several hours.

A final subject matter of the present application relates to aqueous compositions which comprise between 5 and 25% by weight, preferably 10 to 20% by weight, of graft copolymers according to the above description.

The compositions are obtained e.g. by the polymerization reaction described above in aqueous solution. It is possible to adjust the pH of the composition to be in the range from 3.5 to 11, e.g. by adding acids or bases.

EXAMPLES

Synthesis

Example 1

A polymer according to the invention was prepared as follows: in a stirred reactor, 151.8 g of a starch hydrolysate (maltodextrin MD 01955, Cerestar/comprises 7.8% moisture) were introduced as initial charge in 548.2 g of water. The mixture was heated to 80° C. and, over a period of 4 h, a solution of 90.4 g (205 mmol) of 3-trimethylammonium propylmethacrylamide chloride (50% strength in water, Evonik), 14.9 g (205 mmol) of acrylic acid (99%, IMCD) in 100 g of water was added. In parallel to this, a solution of 7.0 g of sodium peroxodisulfate (29.4 mmol) in 85 g of water was added. The mixture was then stirred for a further 2 h at 80° C. and then cooled to 60° C. A solution of 1.0 g of sodium metabisulfite in 9 g of water and 0.7 g of tert-butyl hydroperoxide in 1.8 g of water were then added. The mixture was then stirred for 2 h at 60° C. Then, by adding 32% strength aqueous sodium hydroxide solution, the pH was adjusted to 6.0. The finished product has an active content of 20%.

Example 2

A further polymer according to the invention was prepared as follows: in a stirred reactor, 151.8 g of a starch hydrolysate (maltodextrin MD 01955, Cerestar/comprises 7.8% moisture) were introduced as initial charge in 548.2 g of water. The mixture was heated to 80° C. and, over a period of 2 h, a solution of 34.0 g (77 mmol) of 3-trimethylammonium propylmethacrylamide chloride (50% strength in water, Evonik), and 39.2 g of water was added in 4 portions. In parallel to this, a solution of 3.5 g (14.7 mmol) of sodium peroxodisulfate in 35 g of water was added. Over a further 2 h, a solution of 34.0 g (77 mmol) of 3-trimethylammonium propylmethacrylamide chloride (50% strength in water, Evonik), 26.0 g (357 mmol) of acrylic acid (99%, IMCD) and 26.6 g of water, the pH of which had been adjusted to pH 6 by adding 32% strength sodium hydroxide solution, was added in 4 portions. In parallel to this, a solution of 3.5 g (14.7 mmol) of sodium peroxodisulfate in 35 g of water was added. The mixture was then stirred for a further 2 h at 80° C. and then cooled to 60° C. A solution of 1.0 g of sodium metabisulfite in 9 g of water and 0.7 g of tert-butyl hydroperoxide and 1.8 g of water were then added. The mixture was then stirred for 2 h at 60° C. Then, by adding 32% strength aqueous sodium hydroxide solution, the pH was adjusted to 6.0. The finished product has an active content of 20%.

Example 3

A polymer according to the invention was prepared as follows: in a stirred reactor, 108.5 g of a starch hydrolysate (maltodextrin MD 01955, Cerestar/comprises 7.8% moisture) were introduced as initial charge in 391.5 g of water. The mixture was heated to 80° C. and, over a period of 6 h, a solution of 113.4 g (257 mmol) of 3-trimethylammonium propylmethacrylamide chloride (50% strength in water, Evonik) and 43.9 g (603 mmol) of acrylic acid (99%, IMCD) in 177.8 g of water was added continuously. In parallel to this, a solution of 7.0 g (29.4 mmol) of sodium peroxodisulfate in 85 g of water is added. The solution was then stirred for a further 2 h at 80° C. and then cooled to 50° C. Afterwards, a solution of 1.0 g (5.3 mmol) of sodium metabisulfite in 9.0 g of water and 0.7 g of tert-butyl hydroperoxide (70% strength) in 1.8 g of water was added. The mixture was then stirred for 30 minutes at 50° C. The finished product has an active content of 20%.

Example 4

A further polymer according to the invention was prepared as follows: in a stirred reactor, 160.9 g of a starch hydrolysate (maltodextrin MD 01955, Cerestar/comprises 6.8% moisture) were introduced as initial charge in 589.1 g of water. The mixture was heated to 80° C. and, over a period of 2 h, a solution of 28.4 g (64 mmol) of 3-trimethylammonium propylmethacrylamide chloride (50% strength in water, Evonik), and 8.6 g of water was added in 4 portions. In parallel to this, a solution of 3.5 g (14.7 mmol) of sodium peroxodisulfate in 35 g of water was added. Over a further 2 h, a solution of 28.4 g (64 mmol) of 3-trimethylammonium propylmethacrylamide chloride (50% strength in water, Evonik), 21.9 g (301 mmol) of acrylic acid (99%, IMCD) and 9.8 g of water, the pH of which had been adjusted to pH 7 by adding 32% strength sodium hydroxide solution, was added in 4 portions. In parallel to this, a solution of 3.5 g (14.7 mmol) of sodium peroxodisulfate in 35 g of water was added. The mixture was then stirred for a further 2 h at 80° C. and then cooled to 60° C. A solution of 0.65 g of sodium metabisulfite in 5.85 g of water and 0.7 g of tert-butyl hydroperoxide (70% strength) in 1.8 g of water were then added. The mixture was then stirred for 2 h at 60° C. The pH was then adjusted to 5.5 by adding citric acid. The finished product has an active content of 20%.

Example 5

A polymer according to the invention was prepared as follows: in a stirred reactor, 107.3 g of a starch hydrolysate (maltodextrin MD 01955, Cerestar/comprises 6.8% moisture) were introduced as initial charge in 392.7 g of water. The mixture was heated to 80° C. and, over a period of 2 h, a solution of 22.1 g (105.6 mmol) of 2-acrylamido-2-methylpropane sulfonic acid (99%, Lubrizol), 7.7 g (105.8 mmol) of acrylic acid (99%, IMCD) and 75 g of water, which was adjusted to pH 6 with 32% strength sodium hydroxide solution, was added. In parallel to this, a solution of 3.5 g (14.7 mmol) of sodium peroxodisulfate in 42.5 g of water is added. And then, over a period of 2 h, a solution of 22.1 g (105.6 mmol) of 2-acrylamido-2-methylpropanesulfonic acid (99%, Lubrizol), 7.7 g (105.8 mmol) of acrylic acid (99%, IMCD) and 80.7 g (183 mmol) of 3-trimethylammonium propylmethacrylamide chloride (50% strength in water, Evonik) in 125 g of water and 25.5 g of 32% strength sodium hydroxide solution was added (in 4 portions). In parallel to this, a solution of 3.5 g (14.7 mmol) of sodium peroxodisulfate in 42.5 g of water is added. The solution was then stirred for a further 2 h at 80° C. and then cooled to 60° C. A solution of 1.0 g (5.3 mmol) of sodium metabisulfite in 9.0 g of water and 0.7 g of tert-butyl hydroperoxide (70% strength) in 1.8 g of water was then added. The mixture was then stirred for 2 h at 60° C. Then, by adding 32% strength aqueous sodium hydroxide solution, the pH was adjusted to pH 6.0. The finished product has an active content of 20%.

Example 6

A further polymer according to the invention was prepared as follows: in a stirred reactor, 150.2 g of a starch hydrolysate (maltodextrin MD 01955, Cerestar/comprises 6.8% moisture) were introduced as initial charge in 549.8 g of water. The mixture was heated to 80° C. and, over a period of 2 h, a solution of 32.0 g (72.6 mmol) of 3-trimethylammonium propylmethacrylamide chloride (50% strength in water, Evonik), 1.5 g (6 mmol) of diallyldimethylammonium chloride (65% strength in water, Aldrich) and 26.6 g of water was added. In parallel to this, a solution of 3.5 g (14.7 mmol) of sodium peroxodisulfate in 35 g of water is added. Over a further 2 h, a solution of 32.0 g (72.6 mmol) of 3-trimethylammonium propylmethacrylamide chloride (50% strength in water, Evonik), 3.7 g (14.9 mmol) of diallyldimethylammonium chloride (65% strength in water, Aldrich), 24.6 g (338 mmol) of acrylic acid (99%, IMCD) and 26.6 g of water, the pH of which had been adjusted to pH 7 by adding 32% strength sodium hydroxide solution, was added. In parallel to this, a solution of 3.5 g (14.7 mmol) of sodium peroxodisulfate in 35 g of water was added. The mixture was then stirred for a further 2 h at 80° C. and then cooled to 60° C. A solution of 0.65 g of sodium metabisulfite in 5.85 g of water and 0.7 g of tert-butyl hydroperoxide in 1.8 g of water were then added. The mixture was then stirred for 2 h at 60° C. The pH was adjusted to pH 5.5 by adding 10% strength hydrochloric acid. The finished product has an active content of 20%.

Example 7

A further polymer according to the invention was prepared as follows: in a stirred reactor, 173.4 g of a starch hydrolysate (maltodextrin MD 01955, Cerestar/comprises 6.8% moisture) were introduced as initial charge in 600.0 g of water. The mixture was heated to 80° C. and, over a period of 4 h, a solution of 30.3 g (110 mmol) of (3-acrylamidopropyl)trimethylammonium chloride (75% strength in water, Aldrich), 17.5 g (240.4 mmol) of acrylic acid (99%, IMCD) and 54 g of water, the pH of which had been adjusted to pH 7.0 by adding 32% strength sodium hydroxide solution, was added in 8 portions. In parallel to this, a solution of 7.0 g (29.4 mmol) of sodium peroxodisulfate in 70 g of water was added. The mixture was then stirred for a further 2 h at 80° C. and then cooled to 60° C. A solution of 0.65 g of sodium metabisulfite in 5.85 g of water and 0.7 g of tert-butyl hydroperoxide in 1.8 g of water were then added. The mixture was then stirred for 2 h at 60° C. The pH was then adjusted to 5.5 by adding citric acid. The finished product has an active content of 20%.

Application Testing

Biodegradability:

To measure the biodegradability, a modified storm test (OECD-$CO_2$ evolution test according to 301 B (July 1992)) was used. For this, the polymer was inoculated in an aqueous medium, comprising potassium dihydrogenphosphate, dipotassium hydrogenphosphate, disodium hydrogenphosphate hydrate, ammonium chloride, calcium chloride hydrate, magnesium sulfate hydrate and iron(II) chloride hydrate together with activated sludge and stored under a $CO_2$-free atmosphere in diffuse light for 28 days. The carbon dioxide released as a result of degradation during the experiment was captured and determined quantitatively. Taking into consideration the theoretically possible amount of $CO_2$ formed upon complete degradation, the measured degradation was determined as a percentage.

All of the polymers according to the invention in examples 1 to 7 above have a biodegradability of from 39 to 72% after 28 days.

Hydrophilization of Surfaces:

The hydrophilizing properties of the polymers are assessed by the run-off behavior on specimens (preferably black ceramic tiles). For this, in each case 25 drops of test solution (in 5 series with 5 drops per series) are applied using a 3 ml single-use pipette to a cleaned tile and spread using a folded paper towel. Spreading takes place by wiping without pressure, the tile surface being wiped in 10 rows from top to bottom and bottom to top towards the right and the same in 10 rows towards the left. By passing over tap water, the run-off behavior is assessed, and by spraying with demineralized water, the anti-rain properties are assessed.

Good hydrophilization is evident by the formation of a complete water film, which does not tear during the run-off and drying time.

Anti-Rain Test

A 3 ml single-use pipette is used to apply 25 drops of cleaner in 5 series with 5 drops per series to a cleaned dry tile and spread using a folded paper towel (KIMWIPES® from Kimberley Clark). Spreading takes place by wiping without pressure, the tile surface being wiped in 10 rows from top to bottom and directly afterwards backwards in 10 rows from bottom to top. After the test solution has dried, the surface is rinsed in a stream of tap water, the stream of water being passed once over the tile surface. After the film of water has completely run off, the surface is sprayed 4 times with demineralized water from a spray bottle. The type of drop distribution achieved thereby serves as a measure of the anti-rain properties. As reference, the parameters for this have been established:

1=complete film
2=drops combine
3=drops/streaks
4=drops isolated.

Shine Test:

Firstly, a cleaned, untreated ceramic tile was measured in terms of shine using a reflectometer. A test formulation was applied to the ceramic tile, as described above, wiped and left to dry. The resulting surface was again tested in terms of shine and compared with the value of the original, clean surface. The shine retention was calculated in percent from the values. The shine was measured using the instrument Micro-TRI-Gloss from BYK Gardner at an angle of 20°.

In all cases, the addition of the polymers according to the invention led to a significant decrease in the contact angle, better spreading of tap water and an improvement in the gloss values of the treated surfaces. The results of the shine test are listed in table 1.

Contact Angle Test

The contact angles were measured on different surfaces (ceramic, glass, stainless steel) by applying a test formulation and wiping. After drying, they were rinsed with demineralized (demin.) water and left to dry. The contact angle with demin. water was measured on the surfaces prepared in this way (apparatus: contact angle measuring device from Dataphysics, Filderstadt, model OCAH-200).

The polymers according to the invention from examples 1 to 7 were investigated in combination with an ethoxylated fatty alcohol (isodecanol 8 EO) as surface-active component. Additionally, the comparison products SOKALAN® HP 70 (a water-soluble homopolymer or copolymer with vinylpyrrolidone, vinylimidazole and nonionic monomers from BASF), MIRAPOL® Surf-S 110 and MIRAPOL® Surf-S 210 (both Rhodia; ammonium acylamide/acrylic acid copolymers) were measured.

Results of the Physical and Application Test:

TABLE 1

| Shine retention | |
| --- | --- |
| Formulation | Shine retention |
| 1.0% isodecanol + 8 EO | 79.1% |
| 0.1% AS example 1 + 1.0% isodecanol 8 EO | 88.7% |
| 0.1% AS example 2 + 1.0% isodecanol 8 EO | 88.7% |
| 0.1% AS example 3 + 1.0% isodecanol 8 EO | 87.9% |
| 0.1% AS example 4 + 1.0% isodecanol 8 EO | 87.0% |
| 0.1% AS example 5 + 1.0% isodecanol 8 EO | 81.8% |
| 0.1% AS example 6 + 1.0% isodecanol 8 EO | 88.5% |
| 0.1% AS example 7 + 1.0% isodecanol 8 EO | 87.5% |
| 0.1% AS SOKALAN ® HP 70 + 1.0% isodecanol 8 EO | 85.1% |
| 0.1% AS MIRAPOL ® Surf-S 110 + 1.0% isodecanol 8 EO | 77.7% |
| 0.1% AS MIRAPOL ® Surf-S 210 + 1.0% isodecanol 8 EO | 74.4% |
| 0.1% polyquaternium 6 + 1.0% isodecanol 8 EO | 79.9% |
| 0.1% polyquaternium 7 + 1.0% isodecanol 8 EO | 74.8% |

Polyquaternium 6: Diallyldimethylammonium chloride homopolymer
Polyquaternium 7: Dimethyldiallylammonium chloride acrylamide copolymer
AS: Active substance

TABLE 2

| Contact angle on black ceramic tiles | |
| --- | --- |
| Formulation | Contact angle of water |
| Untreated | 25° |
| 0.1% AS example 2 + 1.0% isodecanol 8 EO | 7° |
| 0.1% AS example 3 + 1.0% isodecanol 8 EO | 4° |
| 0.1% AS example 4 + 1.0% isodecanol 8 EO | 7° |
| 0.1% AS SOKALAN ® HP 70 + 1.0% isodecanol 8 EO | 4° |
| 0.1% AS MIRAPOL ® Surf-S 110 + 1.0% isodecanol 8 EO | 8° |
| 0.1% AS MIRAPOL ® Surf-S 210 + 1.0% isodecanol 8 EO | 14° |

TABLE 3

| Contact angle on glass | |
| --- | --- |
| Formulation | Contact angle of water |
| Untreated | 39° |
| 0.1% AS example 2 + 1.0% isodecanol 8 EO | 17° |
| 0.1% AS example 3 + 1.0% isodecanol 8 EO | 15° |
| 0.1% AS example 4 + 1.0% isodecanol 8 EO | 17° |
| 0.1% AS SOKALAN ® HP 70 + 1.0% isodecanol 8 EO | 8° |
| 0.1% AS MIRAPOL ® Surf-S 110 + 1.0% isodecanol 8 EO | 15° |
| 0.1% AS MIRAPOL ® Surf-S 210 + 1.0% isodecanol 8 EO | 17° |

TABLE 4

| Contact angle on stainless steel | |
| --- | --- |
| Formulation | Contact angle of water |
| Untreated | 60° |
| 0.1% AS example 3 + 1.0% isodecanol + 8 EO | 52° |

TABLE 4-continued

Contact angle on stainless steel

| Formulation | Contact angle of water |
|---|---|
| 0.1% AS example 4 + 1.0% isodecanol + EO | 47° |
| 0.1% AS SOKALAN ® HP 70 + 1.0% isodecanol + EO | 55° |

The results show that the polymers according to the invention are suitable for reducing the contact angle of water on inorganic surfaces (hydrophilizing).

Run-Off Behavior of Water and Anti-Rain Behavior:

For all test products, after rinsing with tap water (16° German hardness), the wetting behavior of the water film and the run-off and drying behavior with time are assessed. In order to assess the anti-rain behavior, demineralized water is sprayed as a mist onto the surface using a standard commercial spray bottle and the combining of the water droplets is assessed.

The products according to the invention exhibit in each case complete wetting of the surface, a run-off without tearing of the water film, and drying without residues. In the case of an untreated tile, an irregular film was observed, and also drying residues.

The invention claimed is:

1. A method for the hydrophilization and/or improvement in shine retention of hard surfaces comprising the step of contacting a hard surface with a cleaning composition comprising one or more water-soluble graft copolymers and one or more surface-active compounds, wherein said water-soluble graft copolymers are prepared by the free-radical initiated graft polymerization of:
    (A) 40 to 90% by weight of one or more components selected from the group consisting of monosaccharides, oligosaccharides, polysaccharides and derivatives thereof;
    (B) 5 to 40% of one or more monomers selected from the group consisting of ethylenically unsaturated C3-C10 monocarboxylic acids, alkali metal salts thereof, and ammonium salts thereof; and
    (C) 10 to 50% by weight of one or more monomers selected from the group consisting of 3-trimethylammonium propyl methacrylamide, dimethyldiallylammonium chloride and acrylamidopropyltrimethylammonium chloride;
    wherein all weight percentages are based on the total weight of (A), (B) and (C);
    wherein said graft copolymers are free from di- and/or polycarboxylic acids as monomer components, and free from maleic acid and/or maleic anhydride,
    whereby said hard surface shows increased hydrophilic properties and/or increased shine retention.

2. The method of claim 1, wherein the weight fraction of the monomers (C) is larger than the weight fraction of the monomers (B) in said water-soluble graft copolymers.

3. The method of claim 1, wherein component (A) comprises hydrolytically degraded polysaccharides.

4. The method of claim 3, wherein said polysaccharides comprise maltodextrins.

5. The method of claim 1, wherein monomers (B) comprise acrylic acid and/or methacrylic acid.

6. The method of claim 1, wherein monomers (C) comprise 3-trimethylammonium propylmethacrylamide chloride and/or dimethyldiallylammonium chloride.

7. The method of claim 1, wherein said graft copolymers are free from di and/or polycarboxylic acids.

8. The method of claim 7, wherein said graft copolymers are free from maleic acid and/or maleic anhydride.

9. The method of claim 1, wherein component (A) is present in amounts of 50 to 80% by weight, the monomers (B) are present in amounts of 15 to 35% by weight and the monomers (C) are present in amounts of 10 to 20% by weight, based on the total amount of (A), (B) and (C).

10. The method of claim 1, wherein said monomers (B) and (C) are present in a weight ratio of 1:1.5 to 1:1.4.

11. A water-soluble graft copolymer prepared by the free-radical initiated graft polymerization of:
    (A) 40 to 90% by weight of one or more components selected from the group consisting of monosaccharides, oligosaccharides, polysaccharides and derivatives thereof;
    (B) 5 to 40% of one or more monomers selected from the group consisting of ethylenically unsaturated C3-C10 monocarboxylic acids, alkali metal salts thereof, and ammonium salts thereof; and
    (C) 10 to 50% by weight of one or more monomers selected from the group consisting of 3-trimethylammonium propyl methacrylamide, dimethyldiallylammonium chloride and acrylamidopropyltrimethylammonium chloride;
    wherein all weight percentages are based on the total weight of (A), (B) and (C)
    wherein said graft copolymers are free from di- and/or polycarboxylic acids as monomer components, and free from maleic acid and/or maleic anhydride.

12. The water-soluble graft copolymer of claim 11, prepared by free-radically initiated graft polymerization of:
    (A) 45 to 90% by weight of maltodextrin;
    (B) 10 to 40% by weight of 3-trimethylammonium propylmethacrylamide chloride and/or dimethyldiallylammonium chloride; and
    (C) 5 to 30% by weight of acrylic acid;
    wherein all weight percentages are based on the total weight of (A), (B) and (C).

13. A cleaning composition comprising:
    (a) at least one surfactant,
    (b) at least one graft copolymer of claim 11,
    (c) optionally, water, and
    (d) optionally, other ingredients.

14. A process for preparing graft copolymers of claim 11, comprising the steps of:
    (i) providing an aqueous solution of component (A), heated to a temperature of 60 to 95° C.,
    (ii) adding a mixture of monomers (B) and/or (C), simultaneously with a free-radical initiator, optionally in two or more portions to form a reaction mixture, and
    (iii) reacting said mixture at a temperature of 60 to 95° C.

15. An aqueous composition comprising 5 to 25% by weight of the graft copolymer of claim 11.

* * * * *